United States Patent
Wu

(10) Patent No.: US 11,619,086 B2
(45) Date of Patent: Apr. 4, 2023

(54) SUSPENSION HOLDER AND FRAME UNIT THEREOF

(71) Applicant: WISTRON NEWEB CORPORATION, Hsinchu (TW)

(72) Inventor: Yu-Shuo Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 331 days.

(21) Appl. No.: 17/159,194

(22) Filed: Jan. 27, 2021

(65) Prior Publication Data

US 2021/0381290 A1    Dec. 9, 2021

(30) Foreign Application Priority Data

Jun. 3, 2020  (TW) .................................. 109118665

(51) Int. Cl.
*E05D 15/06* (2006.01)
*F16M 13/02* (2006.01)

(52) U.S. Cl.
CPC ....... *E05D 15/0652* (2013.01); *F16M 13/022* (2013.01); *F16M 13/027* (2013.01); *E05Y 2201/684* (2013.01)

(58) Field of Classification Search
CPC . E05D 15/0652; F16M 13/022; F16M 13/027
USPC ....................................................... 248/343
See application file for complete search history.

(56) References Cited

U.S. PATENT DOCUMENTS

| | | | | |
|---|---|---|---|---|
| 6,360,507 B1 * | 3/2002 | Nevers | ................... | E04B 9/006 248/306 |
| 8,453,988 B2 * | 6/2013 | Simpson | ................ | E04B 9/006 248/228.3 |
| 9,955,597 B1 * | 4/2018 | Wu | ...................... | F16M 13/027 |
| 10,161,565 B2 * | 12/2018 | Wu | .......................... | F16F 1/12 |
| 10,514,127 B2 * | 12/2019 | Wu | ......................... | E04B 9/006 |
| 10,533,703 B1 * | 1/2020 | Nguyen | ............... | F16M 13/027 |
| 11,326,735 B1 * | 5/2022 | Rosenthal | ............. | F16M 13/02 |
| 2014/0117186 A1 * | 5/2014 | Govindasamy | ........ | F16M 11/16 248/317 |

FOREIGN PATENT DOCUMENTS

TW         I695137 B       6/2020

* cited by examiner

*Primary Examiner* — Todd M Epps
(74) *Attorney, Agent, or Firm* — McClure, Qualey & Rodack, LLP

(57) ABSTRACT

A suspension holder and a frame unit thereof are provided. The frame unit includes a main segment, a suspension segment, and a holding segment. The main segment is in an elongated shape defining a longitudinal direction. The main segment includes a selecting portion, two long lateral edges, a first mating portion, and a second mating portion, the latter two of which are spaced apart from the selecting portion along the longitudinal direction. The suspension segment and the holding segment extend from the two long lateral edges of the main segment, respectively. The selecting portion selectively geometrically corresponds with the first mating portion or the second mating portion.

19 Claims, 15 Drawing Sheets

SUSPENSION HOLDER AND FRAME UNIT THEREOF

CROSS-REFERENCE TO RELATED PATENT APPLICATION

This application claims the benefit of priority to Taiwan Patent Application No. 109118665, filed on Jun. 3, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a frame, and more particularly to a suspension holder and a frame unit thereof.

BACKGROUND OF THE DISCLOSURE

When an installed structure needs to be assembled with a conventional suspension holder, the conventional suspension holder would be formed in a structure that matches the shape or size of the installed structure in advance. In other words, when installed structures having different sizes need to be respectively assembled with conventional suspension holders, the conventional suspension holders are formed in different matching structures in advance for being fixed to the installed structures having different shapes or sizes, thereby increasing the production cost of the conventional suspension holders (e.g., different molds or components need to be prepared).

SUMMARY OF THE DISCLOSURE

In response to the above-referenced technical inadequacies, the present disclosure provides a suspension holder and a frame unit thereof to effectively improve on the issues associated with conventional suspension holders.

In one aspect, the present disclosure provides a suspension holder, which includes two frame units. The two frame units are configured to be selectively hung on a first structure or a second structure. Moreover, a width of the first structure is less than a width of the second structure. Each of the two frame units includes a main segment, a suspension segment, and a holding segment. The main segment is in an elongated shape defining a longitudinal direction. The main segment includes a selecting portion, two long lateral edges, a first mating portion, and a second mating portion. The first mating portion and the second mating portion are spaced apart from the selecting portion along the longitudinal direction. The suspension segment and the holding segment respectively extend from the two long lateral edges of the main segment. When the suspension holder is assembled with the first structure through the suspension segments of the two frame units so as to be at a first position, the selecting portion of any one of the two frame units is fixed in position with the first mating portion of the other one of the two frame units. When the suspension holder is assembled with the second structure through the suspension segments of the two frame units so as to be at a second position, the selecting portion of any one of the two frame units is fixed in position with the second mating portion of the other one of the two frame units.

In another aspect, the present disclosure provides a frame unit of a suspension holder, which includes a main segment, a suspension segment, and a holding segment. The main segment is in an elongated shape defining a longitudinal direction. The main segment includes a selecting portion, two long lateral edges, a first mating portion, and a second mating portion. The first mating portion and the second mating portion are spaced apart from the selecting portion along the longitudinal direction. The suspension segment and the holding segment respectively extend from the two long lateral edges of the main segment. The selecting portion selectively geometrically corresponds with the first mating portion or the second mating portion.

Therefore, in the suspension holder or the frame unit of the present embodiment, the main segment is formed with the selecting portion that selectively geometrically corresponds with the first mating portion or the second mating portion, so that the two frame units can be selectively hung on the first structure or the second structure that have different width, effectively reducing production cost of the suspension holder or the frame unit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
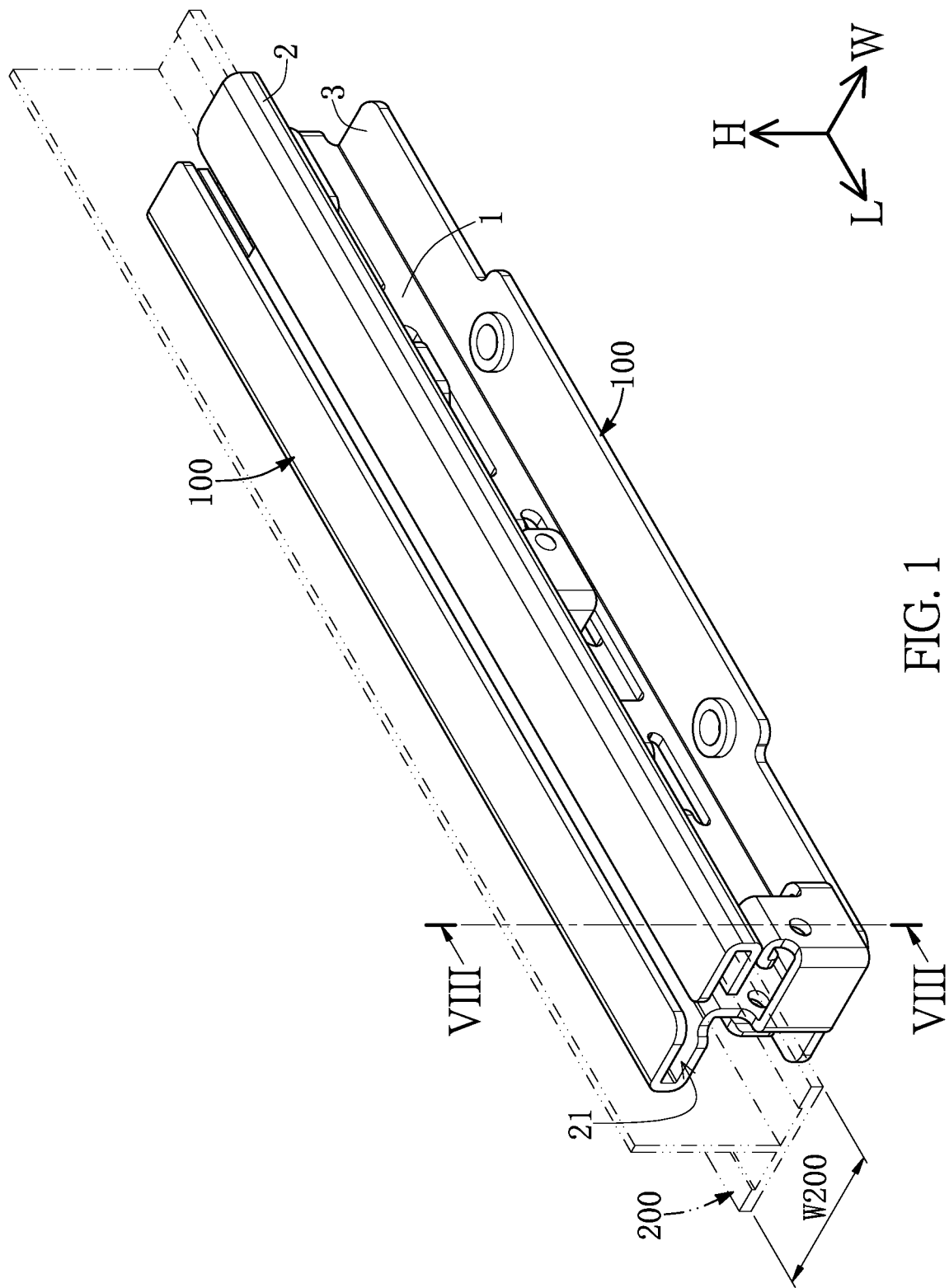
FIG. 1 is a perspective view of a suspension holder used to be assembled with a first structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 12, a first embodiment of the present disclosure provides a suspension holder including two frame units 100 that are in cooperation with each other. The two frame units 100 of the suspension holder in the present embodiment are described in cooperation with each other, but the present disclosure is not limited thereto. In other embodiments of the present disclosure, the frame unit 100 can be independently used (e.g., sold) or can be used in cooperation with other components.

Figure 2:
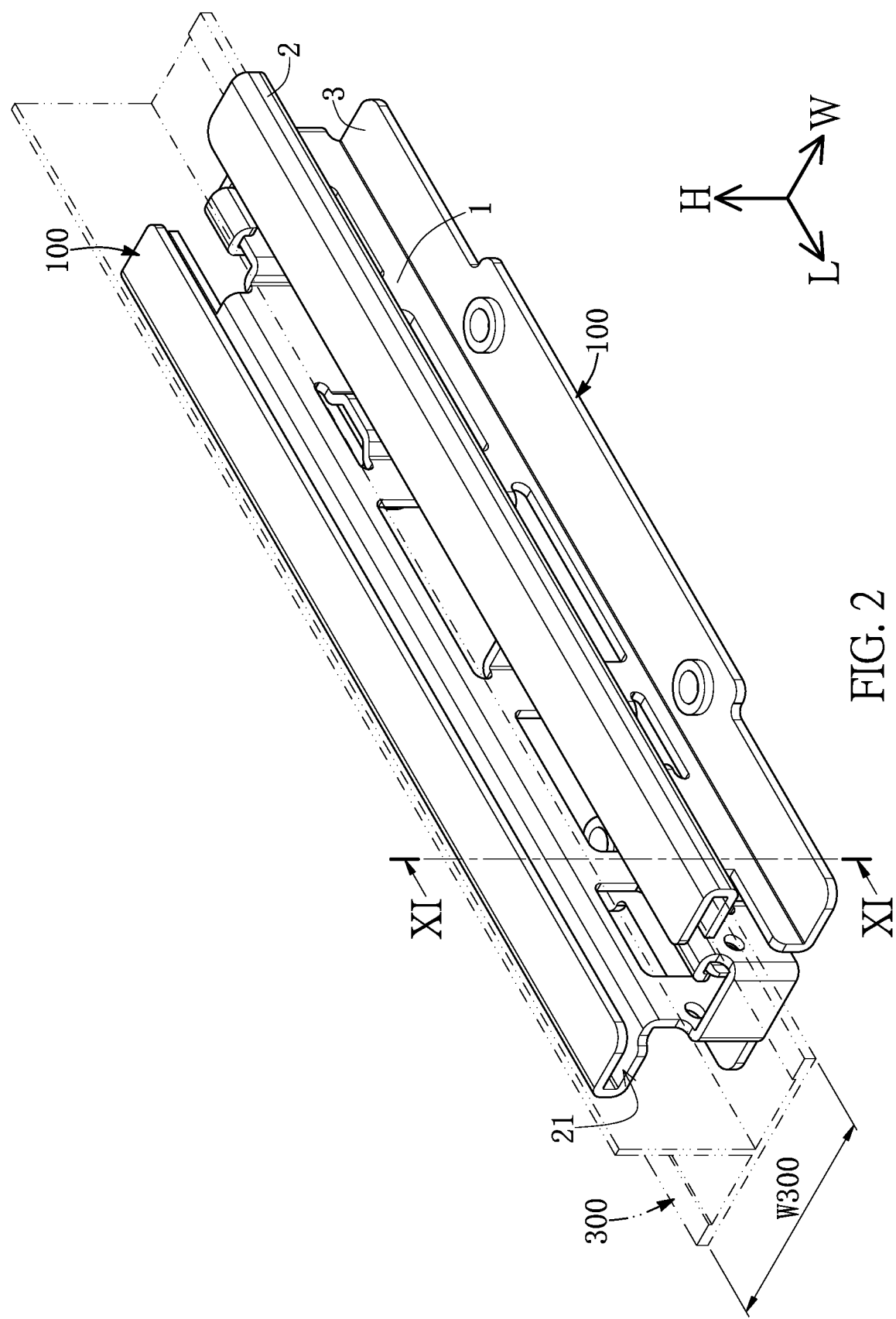
FIG. 2 is a perspective view of the suspension holder used to be assembled with a second structure according to the first embodiment of the present disclosure.
Figure 3:
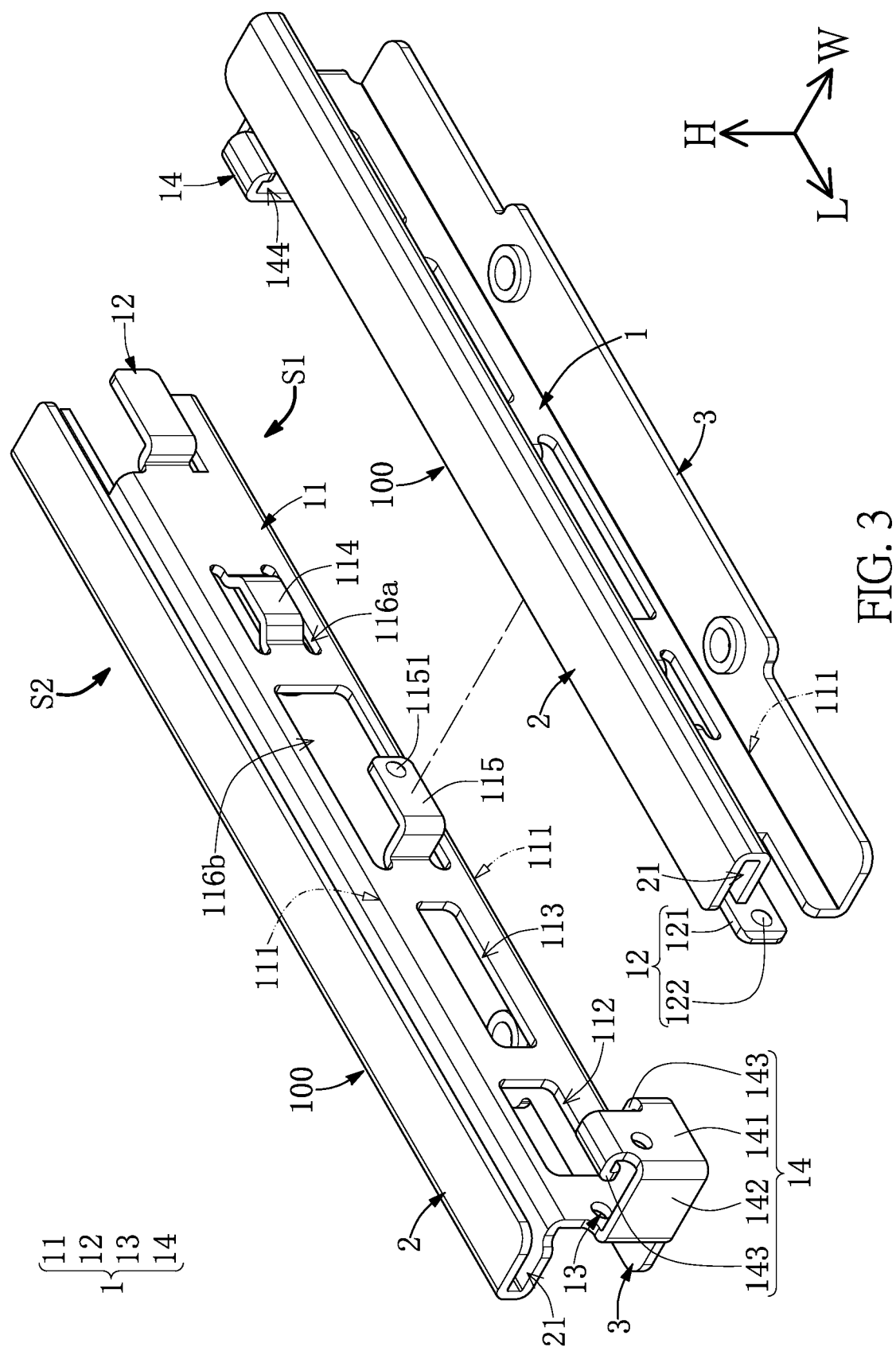
FIG. 3 is an exploded view of the suspension holder according to the first embodiment of the present disclosure.

Moreover, as shown in FIG. 1 to FIG. 3, the two frame units 100 are selectively hung on a first structure 200 or a second structure 300 along a width direction W that is described in the following description. The second structure 300 is different from the first structure 200, and a width W200 of the first structure 200 is less than a width W300 of the second structure 300. Accordingly, the suspension holder can be used to hang a suspension object (e.g., a projector not shown in the drawings) over the first structure 200 or the second structure 300.

In the present embodiment, the first structure 200 is a first light steel frame assembled with a ceiling, the second structure 300 is a second light steel frame assembled with a ceiling, and the two frame units 100 can be assembled with the first light steel frame or the second light steel frame, but the present disclosure is not limited thereto. For example, in other embodiments of the present disclosure, the first structure 200 and the second structure 300 can be other components different from a light steel frame.

As the two frame units 100 of the suspension holder in the present embodiment are of the substantially same structure and are in a 2-fold rotational symmetry, the following description discloses the structure of just one of the two frame units 100 for the sake of brevity, but the present disclosure is not limited thereto. For example, in other embodiments of the present disclosure, the two frame units 100 of the suspension holder can be of different structure or can be in an asymmetrical arrangement.

The frame unit 100 in the present embodiment is integrally formed as a one-piece structure by being processed (e.g., cut, punched, and bent) from a metal plate, but the present disclosure is not limited thereto. For example, in other embodiments of the present disclosure, the frame unit 100 can be formed by soldering metal members or can be formed by different materials (e.g., plastic) or processes (e.g., a welding manner or a die casting manner).

Figure 4:
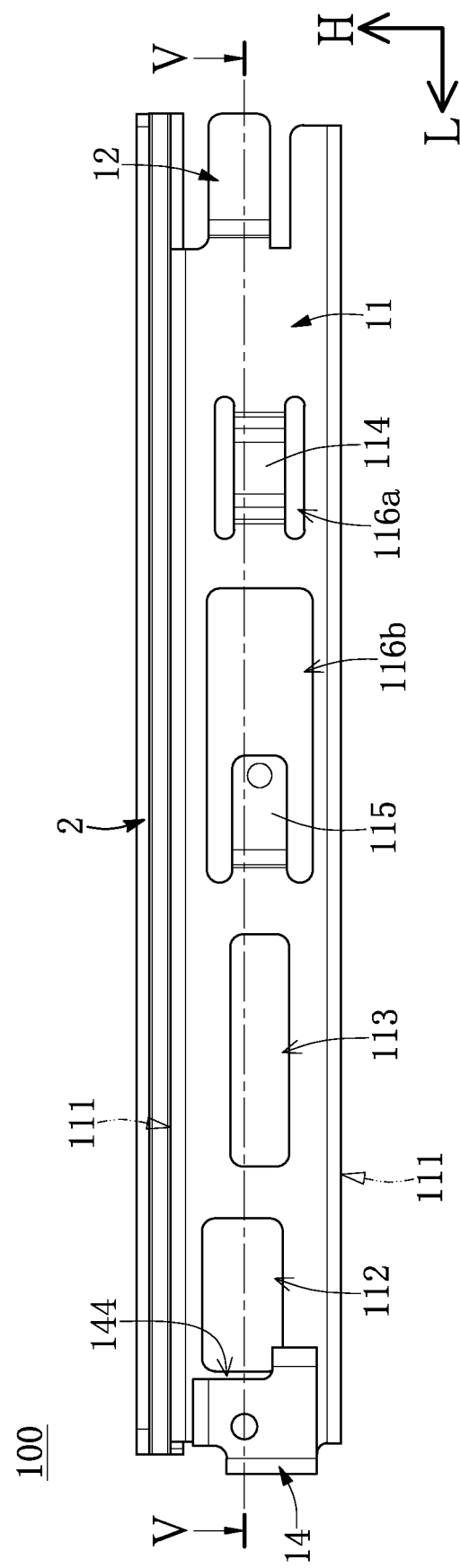
FIG. 4 is a side view showing a frame unit of FIG. 3.
Figure 5:
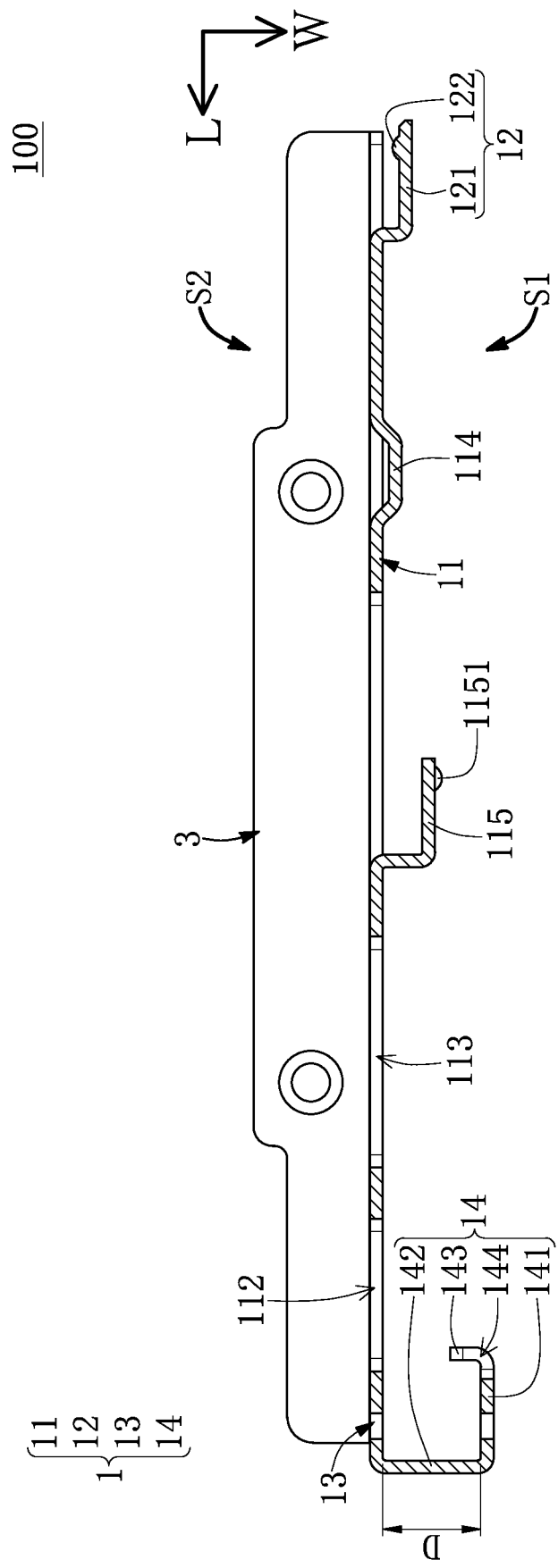
FIG. 5 is a cross-sectional view taken along line V-V of FIG. 4.
Figure 6:
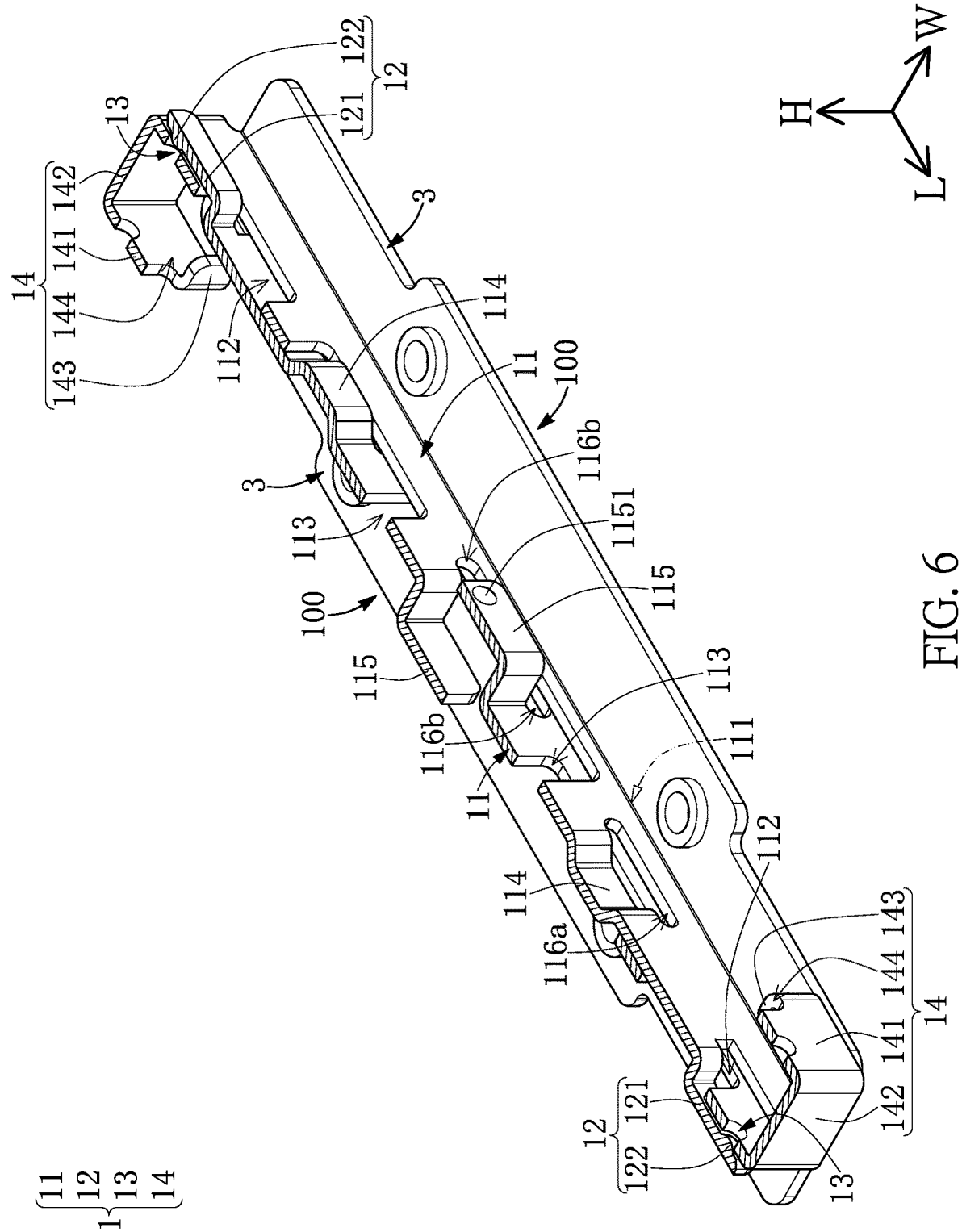
FIG. 6 is a cross-sectional view of the suspension holder of FIG. 1.
Figure 7:
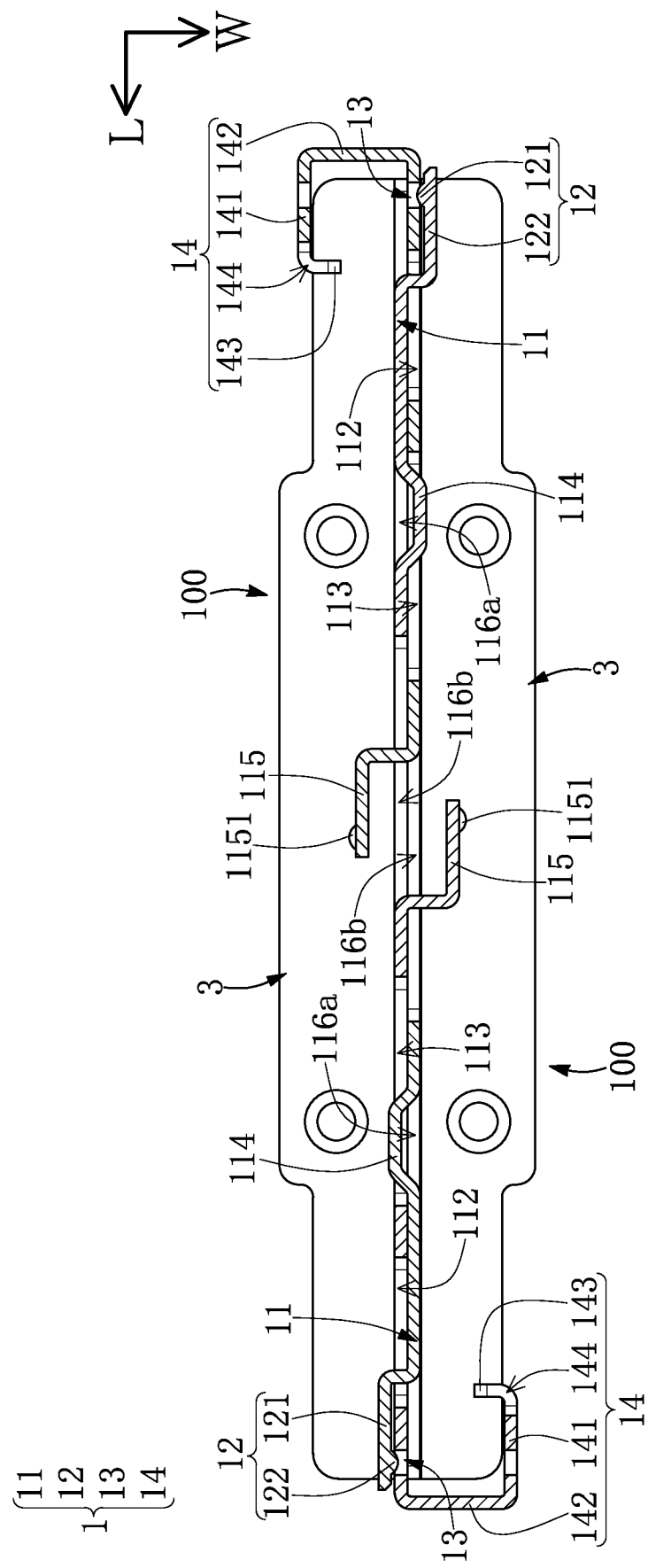
FIG. 7 is a top view of FIG. 6.
Figure 8:
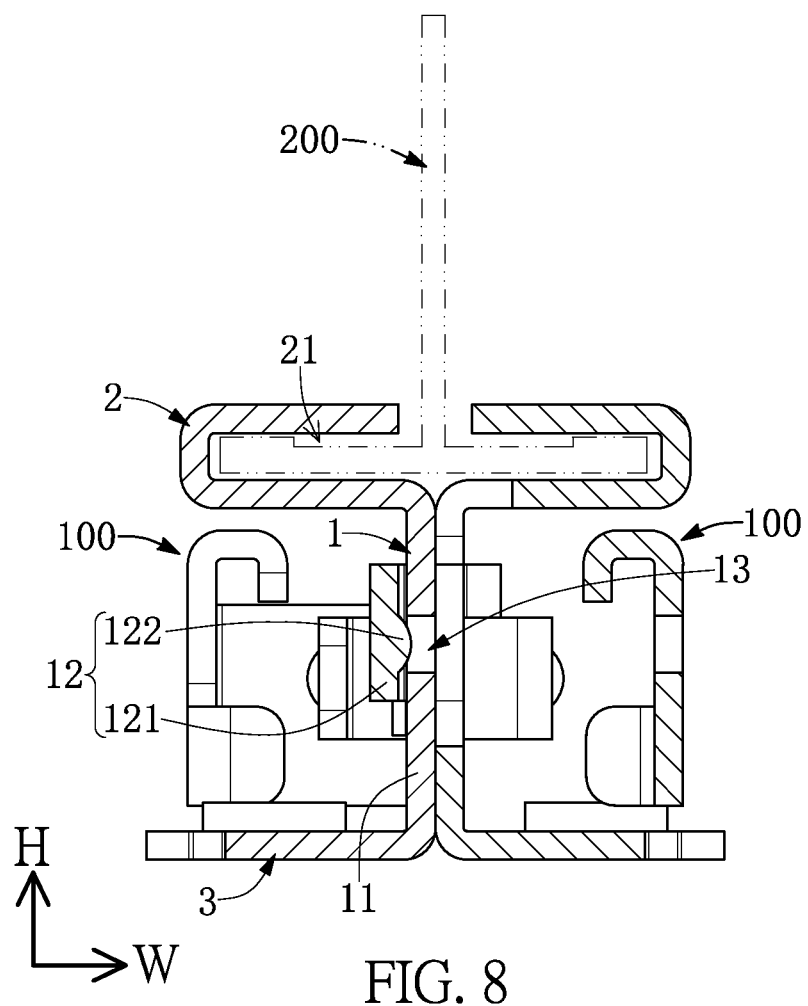
FIG. 8 is a cross-sectional view taken along line VIII-VIII of FIG. 1.
Figure 9:
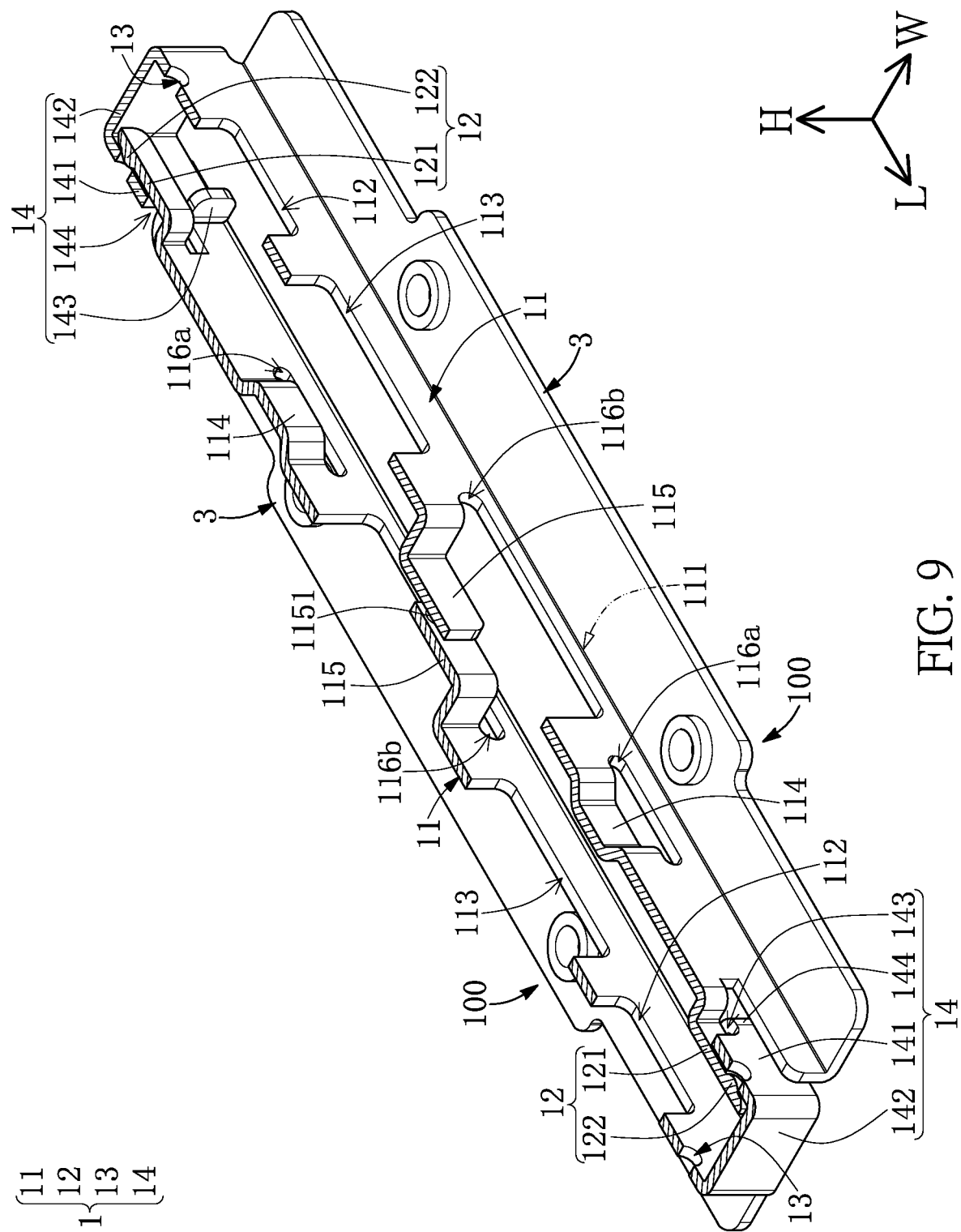
FIG. 9 is a cross-sectional view of the suspension holder of FIG. 2.
Figure 10:
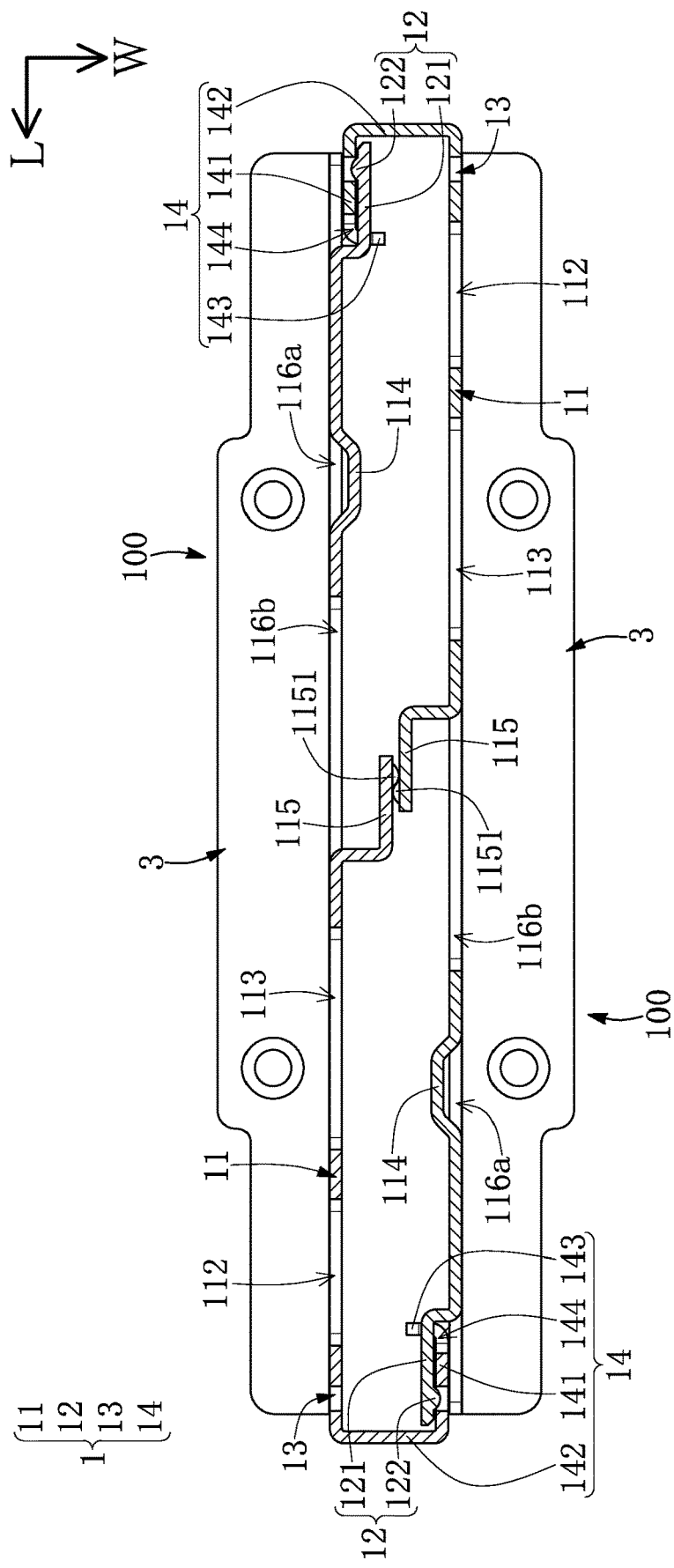
FIG. 10 is a top view of FIG. 9.
Figure 11:
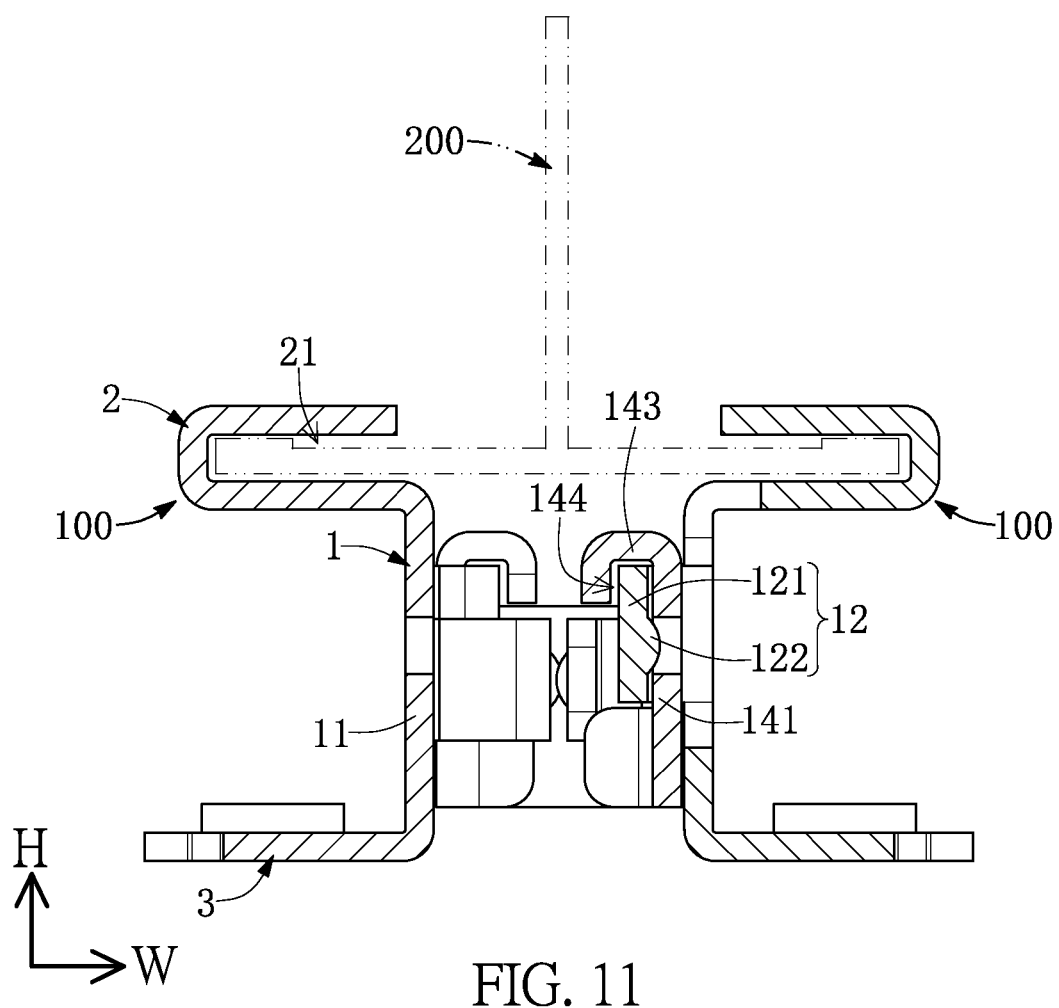
FIG. 11 is a cross-sectional view taken along line XI-XI of FIG. 2.

As shown in FIG. 3 to FIG. 5, the frame unit 100 includes a main segment 1 being an elongated shape defining a longitudinal direction L, a suspension segment 2, and a holding segment 3, the latter two of which are connected to the main segment 1. An outer peripheral edge of the main segment 1 has two long lateral edges 111 each parallel to the longitudinal direction L, and the suspension segment 2 and the holding segment 3 curvedly extend from the two long lateral edges 111 of the main segment 1, respectively.

Specifically, the main segment 1 includes a substrate 11 having the two long lateral edges 111, a selecting portion 12 connected to a first end of the substrate 11, a first mating portion 13 formed on a second end of the substrate 11 that is opposite to the first end, and a second mating portion 14 that is connected to the first mating portion 13. In other words, the first mating portion 13 and the second mating portion 14 are spaced apart from the selecting portion 12 along the longitudinal direction L. In addition, in other embodiments of the present disclosure, the substrate 11 of the main segment 1 can be omitted or can be replaced by other structures according to design requirements.

In order to easily describe the following description of the present embodiment, the main segment 1 further defines the width direction W perpendicular to the longitudinal direction L and defines a height direction H that is perpendicular to the longitudinal direction L and the width direction W. Moreover, the main segment 1 defines an assembling side S1 and a suspension side S2 respectively located at two opposite sides of the substrate 11 along the width direction W.

It should be noted that in order to firmly combine the two frame units 100, the main segment 1 of the frame unit 100 (e.g., the substrate 11) is preferably formed with at least one of the following structures, but the present disclosure is not limited thereto. In other words, in other embodiments of the present disclosure, the main segment 1 can be formed without any one of the following structures.

Specifically, the substrate 11 of the main segment 1 has a first insertion opening 112 arranged adjacent to the first mating portion 13, a rail hole 113 and a sliding portion 114 that are arranged along the longitudinal direction L, and a feedback cantilever 115 that is arranged between the rail hole 113 and the sliding portion 114. Each of the first insertion opening 112 and the rail hole 113 is penetratingly formed in the substrate 11 along the longitudinal direction L, and the sliding portion 114 and the feedback cantilever 115 are located at the assembling side S1 and are formed by punching the substrate 11.

In the present embodiment, the first insertion opening 112, the rail hole 113, the feedback cantilever 115, and the sliding portion 114 are sequentially arranged on the substrate 11 along a direction from the first mating portion 13 toward the selecting portion 12 (e.g., from the left side toward the right side shown in FIG. 5), but the present disclosure is not limited thereto. For example, in other embodiments of the present disclosure, the feedback cantilever 115 can be arranged adjacent to the selecting portion 12, but is not arranged between the rail hole 113 and the sliding portion 114; or, the sliding portion 114 can be arranged adjacent to the first insertion opening 112, and the rail hole 113 is arranged adjacent to the selecting portion 12.

It should be noted that the first insertion opening 112 is shaped to allow the selecting portion 12 to pass therethrough from the assembling side S1 to the suspension side S2. Moreover, a distance between the sliding portion 114 and the selecting portion 12 is substantially less than a maximum distance between the rail hole 113 and the first mating portion 13, and is substantially greater than a minimum distance between the rail hole 113 and the first mating portion 13. The substrate 11 has a notch 116a corresponding in position to the sliding portion 114 and a notch 116b that corresponds in position to the feedback cantilever 115. The sliding portion 114 is substantially in a U-shape, and two ends of the sliding portion 114 are respectively connected to two inner walls of the notch 116a facing each other. The feedback cantilever 115 is substantially in an L-shape, an end of the feedback cantilever 115 is perpendicularly connected to an inner wall of the notch 116b of the substrate 11, and an opposite end (e.g., a free end) of the feedback cantilever 115 has a bump 1151 formed on an outer surface thereof. The free end of the feedback cantilever 115 is punched to be spaced apart from the substrate 11 by a first distance, and the sliding portion 114 is punched to be spaced apart from the substrate 11 by a second distance that is less than the first distance.

The above description describes the preferable structure of the substrate 11 in the present embodiment, and the following description describes the structure of each of the selecting portion 12, the first mating portion 13, and the second mating portion 14. The selecting portion 12 and the second mating portion 14 are located at the assembling side S1, and are in a cantilever shape.

Specifically, the selecting portion 12 includes an insertion cantilever 121 and an engaging structure 122 that is formed on a free end of the insertion cantilever 121. The insertion cantilever 121 is substantially in an L-shape, and an end of the insertion cantilever 121 is perpendicularly connected to the first end of the substrate 11 away from the first mating portion 13. The free end of the insertion cantilever 121 is spaced apart from the substrate 11 along the width direction W by a distance that is substantially equal to a thickness of the substrate 11. The free end of the insertion cantilever 121, the free end of the feedback cantilever 115, and a free end of the second mating portion 14 face toward the same side (e.g., the right side shown in FIG. 5) along the longitudinal direction L.

The selecting portion 12 selectively geometrically corresponds with the first mating portion 13 or the second mating portion 14. In other words, the selecting portion 12 corresponds in shape to each of the first mating portion 13 and the second mating portion 14. In the present embodiment, the engaging structure 122 of the selecting portion 12 corresponds in shape to the first mating portion 13 or the second mating portion 14.

Specifically, the engaging structure 122 in the present embodiment is a protrusion, and each of the first mating portion 13 and the second mating portion 14 has a thru-hole corresponding in shape to the protrusion. Moreover, the thru-holes of the first mating portion 13 and the second mating portion 14 have a predetermined distance D therebetween along the width direction W, and the predetermined distance D can be equal to a difference between the width W200 of the first structure 200 and the width W300 of the second structure 300 (e.g., the predetermined distance D can be within a range of 8 mm to 10 mm), but the present disclosure is not limited thereto.

For example, in other embodiments of the present disclosure, each of the first mating portion 13 and the second mating portion 14 has a concavity corresponding in shape to the protrusion; or, the engaging structure 122 can be a thru-hole or a concavity, and each of the first mating portion 13 and the second mating portion 14 has a protrusion corresponding in shape to the thru-hole or the concavity.

As shown in FIG. 3 to FIG. 5, the second mating portion 14 in the present embodiment includes a positioning segment 141 facing the first mating portion 13 along the width direction W, an arm segment 142 connecting the first mating portion 13 and the positioning segment 141, and a plurality of restricting segments 143 that extend from the positioning segment 141. The positioning segment 141 and the restricting segments 143 jointly define a second insertion opening 144 that is shaped to allow the selecting portion 12 to pass there-through. Moreover, the thru-hole of the second mating portion 14 is formed in the positioning segment 141, and the restricting segments 143 are formed by extending from a peripheral edge of the positioning segment 141 toward the first mating portion 13. In other words, the restricting segments 143 are substantially arranged between the positioning segment 141 and the first mating portion 13.

Figure 12:
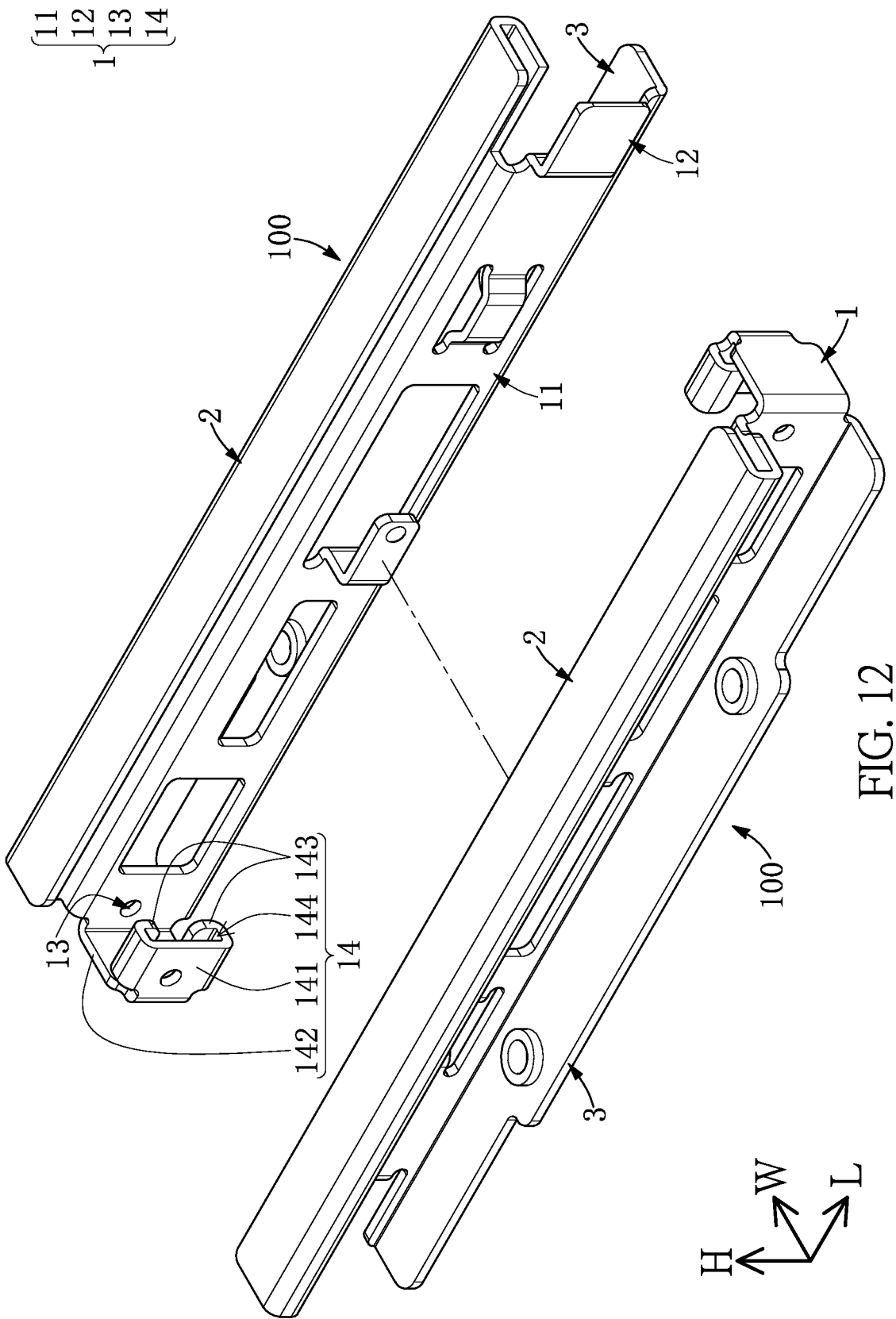
FIG. 12 is a perspective view of the suspension holder in another configuration according to the first embodiment of the present disclosure.

Specifically, the quantity of the restricting segments 143 shown in FIG. 3 is two, the two restricting segments 143 respectively extend from two adjacent edges of the positioning segment 141, and one of the two restricting segments 143 faces toward the arm segment 142, but the present disclosure is not limited thereto. For example, as shown in FIG. 12, the positioning segment 141 and the restricting segments 143 jointly have a C-shaped cross section perpendicular to the longitudinal direction L. In other words, the quantity of the restricting segments 143 shown in FIG. 12 is also two, and the two restricting segments 143 face each other along the height direction H and respectively extend from two edges of the positioning segment 141 away from each other.

As shown in FIG. 3 to FIG. 5 of the present embodiment, the first mating portion 13, the second mating portion 14, the first insertion opening 112, the second insertion opening 144, the rail hole 113, the feedback cantilever 115, and the sliding portion 114, and the selecting portion 12 of the main segment 1 are preferably formed to be substantially located at a distribution plane (e.g., FIG. 5) perpendicular to the height direction H, thereby facilitating the two frame units 100 to be in cooperation with each other, but the present disclosure is not limited thereto. For example, in other embodiments of the present disclosure, the portions of the main segment 1 located at the distribution plane can only include the first mating portion 13, the second mating portion 14, and the selecting portion 12.

In addition, the suspension segment 2 and the holding segment 3 are perpendicularly connected to the two long lateral edges 111 of the main segment 1, respectively, and the suspension segment 2 and the holding segment 3 are located at the suspension side S2. The suspension segment 2 has a U-shaped cross section perpendicular to the longitudinal direction L, and the suspension segment 2 surroundingly defines an elongated groove 21 parallel to the longitudinal direction L. The holding segment 3 is substantially in a sheet-like shape. Moreover, the frame unit 100 can be assembled with the first structure 200 or the second structure 300 through the elongated groove 21 of the suspension segment 2 (as shown in FIG. 1 and FIG. 2), and the holding segment 3 is configured to be fastened to (or screwed with) the suspension object, thereby allowing the suspension object to be hung over the first structure 200 or the second structure 300.

The above description describes the structural features of the frame unit 100, and the following description describes the cooperation of the two frame units 100, but the present disclosure is not limited thereto. The two frame units 100 in the present embodiment are substantially in a 2-fold rotational symmetry, and are assembled with each other from the assembling side S1 thereof.

As shown in FIG. 1 and FIG. 6 to FIG. 8, when the suspension holder is assembled with the first structure 200 through the elongated grooves 21 of the two suspension segments 2 so as to be at a first position, the selecting portion 12 of any one of the two frame units 100 is fixed in position with the first mating portion 13 of the other one of the two frame units 100. Moreover, as shown in FIG. 2 and FIG. 9 to FIG. 11, when the suspension holder is assembled with the second structure 300 through the elongated grooves 21 of the two suspension segments 2 so as to be at a second position, the selecting portion 12 of any one of the two frame units 100 is fixed in position with the second mating portion 14 of the other one of the two frame units 100. Specifically, when the suspension holder is at the first position, the two frame units 100 have a first interval in the width direction W. When the suspension holder is at the second position, the two frame units 100 have a second interval in the width direction W, and the second interval is greater than the first interval by the predetermined distance D.

Accordingly, in the suspension holder or the frame unit 100 of the present embodiment, the main segment 1 is formed with the selecting portion 12 that selectively geometrically corresponds with the first mating portion 13 or the second mating portion 14, so that the two frame units 100 can be selectively hung on the first structure 200 or the second structure 300 that have different widths, thereby effectively reducing production cost of the suspension holder or the frame unit 100.

Specifically, as shown in FIG. 1 and FIG. 6 to FIG. 8, when the suspension holder is at the first position, the selecting portion 12 of any one of the two frame units 100 passes through the first insertion opening 112 of the other one of the two frame units 100 so as to be fixed in position with the first mating portion 13 adjacent thereto, and the selecting portion 12 (or the insertion cantilever 121) of any one of the two frame units 100 is restricted in the first insertion opening 112 of the other one of the two frame units 100 along the height direction H. Moreover, the first mating portion 13 of any one of the two frame units 100 is sandwiched between the selecting portion 12 and the substrate 11 of the other one of the two frame units 100 along the width direction W.

As shown in FIG. 2 and FIG. 9 to FIG. 11, when the suspension holder is at the second position, the selecting portion 12 of any one of the two frame units 100 passes through the second insertion opening 144 of the other one of the two frame units 100 so as to be fixed in position with the positioning segment 141 adjacent thereto, and the selecting portion 12 (or the insertion cantilever 121) of any one of the two frame units 100 is restricted in the second insertion opening 144 of the other one of the two frame units 100 along the height direction H. Moreover, the second mating portion 14 of any one of the two frame units 100 is sandwiched between the selecting portion 12 and the substrate of 11 the other one of the two frame units 100 along the width direction W.

In addition, as shown in FIG. 1 and FIG. 6 to FIG. 8, when the suspension holder is at the first position, the sliding portion 114 of any one of the two frame units 100 is inserted into the rail hole 113 of the other one of the two frame units 100 along the longitudinal direction L, and the sliding portion 114 of any one of the two frame units 100 is restricted in the rail hole 113 of the other one of the two frame units 100 along the height direction H, thereby firmly combining the two frame units 100.

As shown in FIG. 2 and FIG. 9 to FIG. 11, when the suspension holder is at the second position, the two feedback cantilevers 115 face each other and are spaced apart from each other, and the bump 1151 of any one of the two feedback cantilevers 115 abuts against the bump 1151 of the other one of the two feedback cantilevers 115. In other words, the bump 1151 of any one of the two feedback cantilevers 115 is at least partially overlapped with the bump 1151 of the other one of the two feedback cantilevers 115 along the longitudinal direction L. Accordingly, each of the two frame units 100 of the suspension holder can be provided with the feedback cantilever 115 so as to effectively improve the feel thereof during assembly or disassembly.

Second Embodiment

Figure 13:
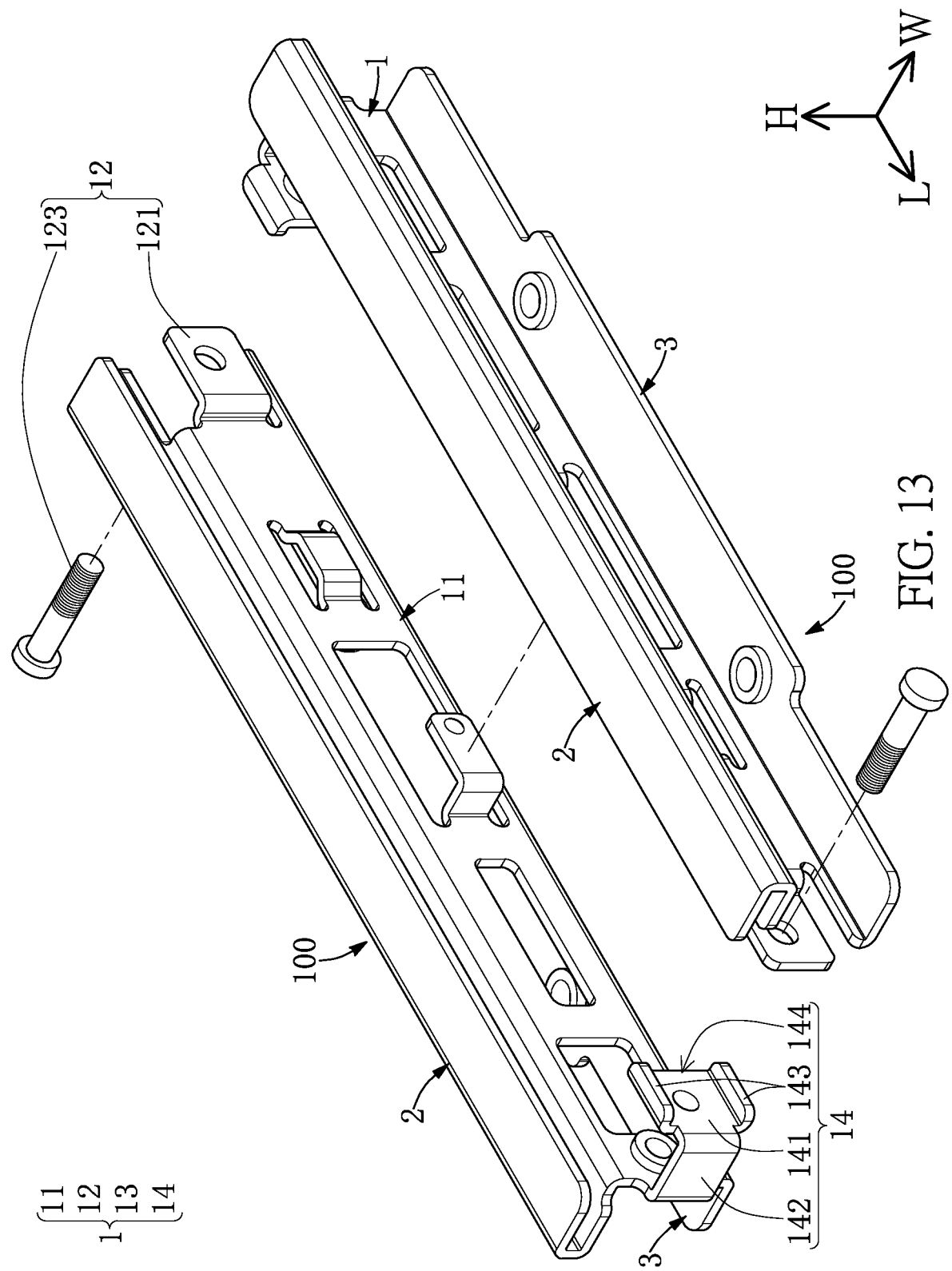
FIG. 13 is an exploded view of a suspension holder according to a second embodiment of the present disclosure.
Figure 14:
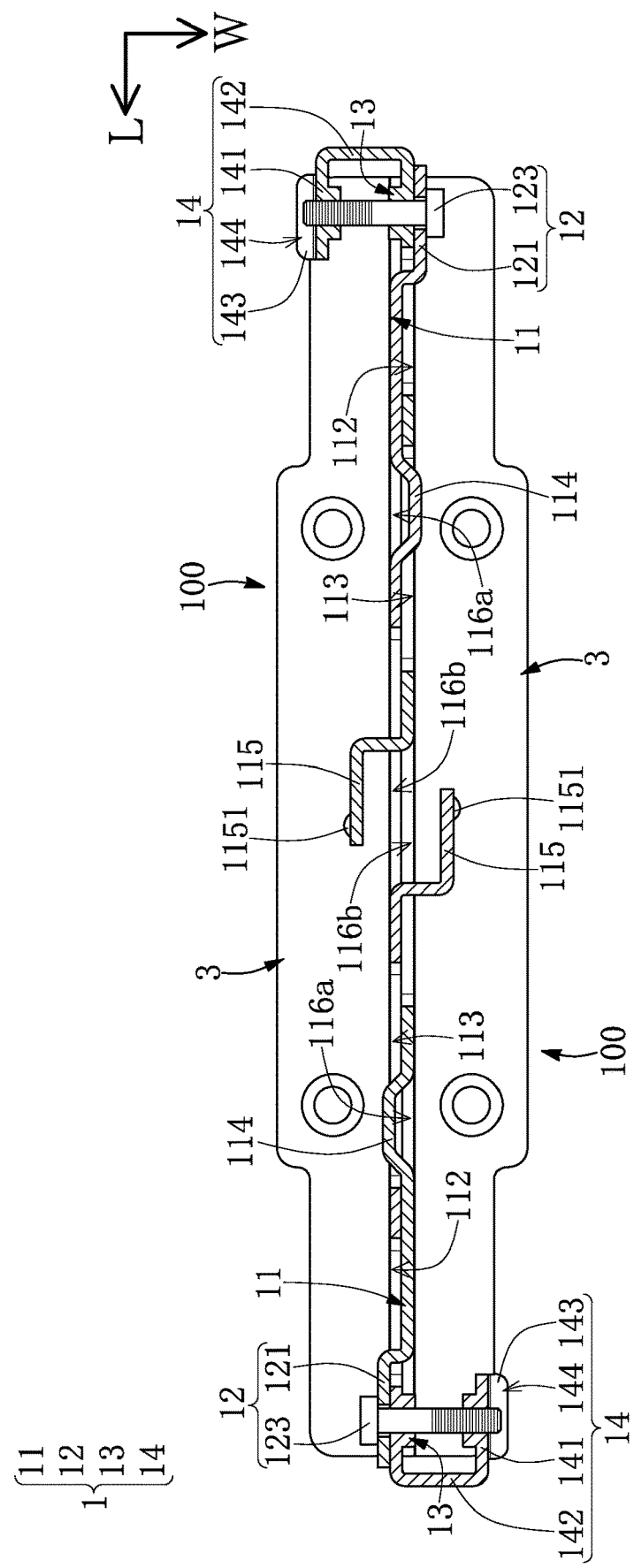
FIG. 14 is a cross-sectional view showing the suspension holder of FIG. 13 used to be assembled with the first structure.
Figure 15:
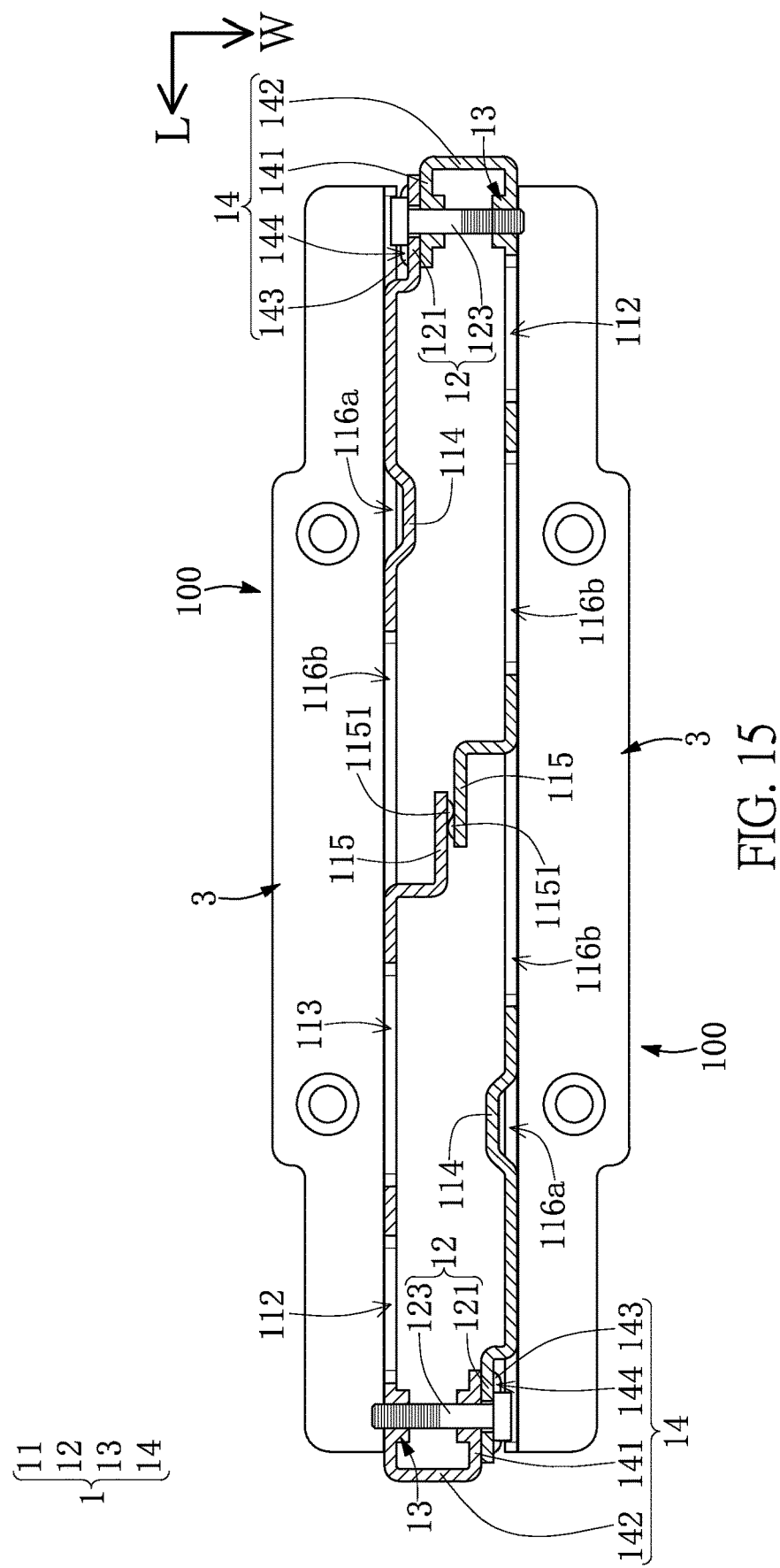
FIG. 15 is a cross-sectional view showing the suspension holder of FIG. 13 used to be assembled with the second structure.

Referring to FIG. 13 to FIG. 15, a second embodiment of the present disclosure is similar to the first embodiment of the present disclosure. For the sake of brevity, descriptions of the same components in the first and second embodiments of the present disclosure (e.g., the substrate 11 of the main segment 1, the suspension segment 2, and the holding segment 3) will be omitted herein, and the following description only discloses different features between the first and second embodiments.

The frame unit 100 in the present embodiment is provided by assembling two components. The selecting portion 12 includes an insertion cantilever 121 and a fixing member 123 (e.g., a screw, a pin, or a buckle) that passes through the insertion cantilever 121. In other words, the selecting portion 12 in the present embodiment does not have the engaging structure 122 disclosed in the first embodiment. Moreover, when the suspension holder is at the first position or the second position, the fixing member 123 of any one of the two frame units 100 is inserted into and fixed to the first mating portion 13 and the second mating portion 14 of the other one of the two frame units 100.

It should be noted that the restricting segments 143 are formed by extending from a peripheral edge of the positioning segment 141 in a direction away from the first mating portion 13. In other words, the restricting segments 143 are substantially located at one side of the positioning segment 141 away from the first mating portion 13. Specifically, the quantity of the restricting segments 143 in the present embodiment is two, and the two restricting segments 143 face each other along the height direction H and respectively extend from two edges of the positioning segment 141 away from each other. Moreover, the positioning segment 141 and the restricting segments 143 jointly have a C-shaped cross section perpendicular to the longitudinal direction L.

In conclusion, in the suspension holder or the frame unit of the present embodiment, the main segment is formed with the selecting portion that selectively geometrically corresponds with the first mating portion or the second mating portion, so that the two frame units can be selectively hung on the first structure or the second structure that have different widths, thereby effectively reducing production cost of the suspension holder or the frame unit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A suspension holder, comprising:
   two frame units configured to be selectively hung on a first structure or a second structure, wherein a width of the first structure is less than a width of the second structure, and wherein each of the two frame units includes:
   a main segment being in an elongated shape defining a longitudinal direction, wherein the main segment includes a selecting portion, two long lateral edges, a first mating portion, and a second mating portion, and wherein the first mating portion and the second mating portion are spaced apart from the selecting portion along the longitudinal direction; and
   a suspension segment and a holding segment respectively extending from the two long lateral edges of the main segment;
   wherein, when the suspension holder is assembled with the first structure through the suspension segments of the two frame units so as to be at a first position, the selecting portion of any one of the two frame units is fixed in position with the first mating portion of the other one of the two frame units, and
   wherein, when the suspension holder is assembled with the second structure through the suspension segments of the two frame units so as to be at a second position, the selecting portion of any one of the two frame units is fixed in position with the second mating portion of the other one of the two frame units.

2. The suspension holder according to claim 1, wherein each of the two frame units is integrally formed as a one-piece structure by being processed from a metal plate, and the two frame units are in a 2-fold rotational symmetry.

3. The suspension holder according to claim 1, wherein in each of the two frame units, the selecting portion includes an insertion cantilever and a fixing member that passes through the insertion cantilever, and wherein, when the suspension holder is at the first position or the second position, the fixing member of any one of the two frame units is inserted into and fixed to the first mating portion and the second mating portion of the other one of the two frame units.

4. The suspension holder according to claim 1, wherein in each of the two frame units, the main segment includes a feedback cantilever having a bump arranged on a free end thereof, and wherein, when the suspension holder is at the second position, the two feedback cantilevers face each other and are spaced apart from each other, and the bump of any one of the two feedback cantilevers abuts against the bump of the other one of the two feedback cantilevers.

5. The suspension holder according to claim 4, wherein in each of the two frame units, the selecting portion includes an insertion cantilever, and the free end of the feedback cantilever and a free end of the insertion cantilever face toward the same side along the longitudinal direction.

6. The suspension holder according to claim 1, wherein in each of the two frame units, the main segment has a sliding portion and a rail hole that is formed in the main segment along the longitudinal direction, wherein, when the suspension holder is at the first position, the sliding portion of any one of the two frame units is inserted into the rail hole of the other one of the two frame units along the longitudinal direction, and the two frame units have a first interval in a width direction perpendicular to the longitudinal direction, and wherein, when the suspension holder is at the second position, the two frame units have a second interval in the width direction, and the second interval is greater than the first interval by a predetermined distance.

7. The suspension holder according to claim 6, wherein, when the suspension holder is at the first position, the sliding portion of any one of the two frame units is restricted in the rail hole of the other one of the two frame units along a height direction that is perpendicular to the longitudinal direction and the width direction.

8. The suspension holder according to claim 6, wherein the main segment of each of the two frame units includes a substrate having the two long lateral edges, and wherein in each of the two frame units, the main segment defines an assembling side and a suspension side respectively located at two opposite sides of the substrate along a width direction perpendicular to the longitudinal direction, and the selecting portion and the second mating portion are located at the assembling side.

9. The suspension holder according to claim 8, wherein in each of the two frame units, the suspension segment and the holding segment are located at the suspension side, the suspension segment has a U-shaped cross section perpendicular to the longitudinal direction, and the suspension segment surroundingly defines an elongated groove parallel to the longitudinal direction.

10. The suspension holder according to claim 8, wherein, when the suspension holder is at the first position, the first mating portion of any one of the two frame units is sandwiched between the selecting portion and the substrate of the other one of the two frame units along the width direction, and wherein, when the suspension holder is at the second position, the second mating portion of any one of the two frame units is sandwiched between the selecting portion and the substrate of the other one of the two frame units along the width direction.

11. The suspension holder according to claim 8, wherein in each of the two frame units, the selecting portion is connected to one end of the substrate, the first mating portion is formed on another end of the substrate, the second mating portion is connected to the first mating portion, and the substrate has a first insertion opening arranged adjacent to the first mating portion, and wherein, when the suspension holder is at the first position, the selecting portion of any one of the two frame units passes through the first insertion opening of the other one of the two frame units so as to be fixed in position with the first mating portion adjacent thereto.

12. The suspension holder according to claim 11, wherein in each of the two frame units, the second mating portion includes a positioning segment facing the first mating portion along the width direction, an arm segment connecting the first mating portion and the positioning segment, and a plurality of restricting segments that extend from the positioning segment, and the positioning segment and the restricting segments jointly define a second insertion opening, and wherein, when the suspension holder is at the second position, the selecting portion of any one of the two frame units passes through the second insertion opening of the other one of the two frame units so as to be fixed in position with the positioning segment adjacent thereto.

13. The suspension holder according to claim 12, wherein in each of the two frame units, the positioning segment and the restricting segments jointly have a C-shaped cross section perpendicular to the longitudinal direction.

14. A frame unit of a suspension holder, comprising:
a main segment being in an elongated shape defining a longitudinal direction, wherein the main segment includes a selecting portion, two long lateral edges, a first mating portion, and a second mating portion, and wherein the first mating portion and the second mating portion are spaced apart from the selecting portion along the longitudinal direction; and
a suspension segment and a holding segment respectively extending from the two long lateral edges of the main segment,
wherein the selecting portion selectively geometrically corresponds with the first mating portion or the second mating portion.

15. The frame unit according to claim 14, wherein the main segment includes a substrate having the two long lateral edges, the main segment defines an assembling side and a suspension side respectively located at two opposite sides of the substrate along a width direction perpendicular to the longitudinal direction, and the selecting portion and the second mating portion are located at the assembling side.

16. The frame unit according to claim 15, wherein the suspension segment and the holding segment are located at the suspension side, the suspension segment has a U-shaped cross section perpendicular to the longitudinal direction, and the suspension segment surroundingly defines an elongated groove parallel to the longitudinal direction.

17. The frame unit according to claim 15, wherein the selecting portion is connected to an end of the substrate, the first mating portion is formed on another end of the substrate, the second mating portion is connected to the first mating portion, and the substrate has a first insertion opening arranged adjacent to the first mating portion.

18. The frame unit according to claim 17, wherein the second mating portion includes a positioning segment facing the first mating portion along the width direction, an arm segment connecting the first mating portion and the positioning segment, and a plurality of restricting segments that extend from the positioning segment, and wherein the positioning segment and the restricting segments jointly define a second insertion opening.

19. The frame unit according to claim 14, wherein the frame unit is integrally formed as a one-piece structure by being processed from a metal plate.

* * * * *